Aug. 7, 1928.
H. B. THOMPSON
HARROW
Filed Aug. 30, 1926
1,679,639
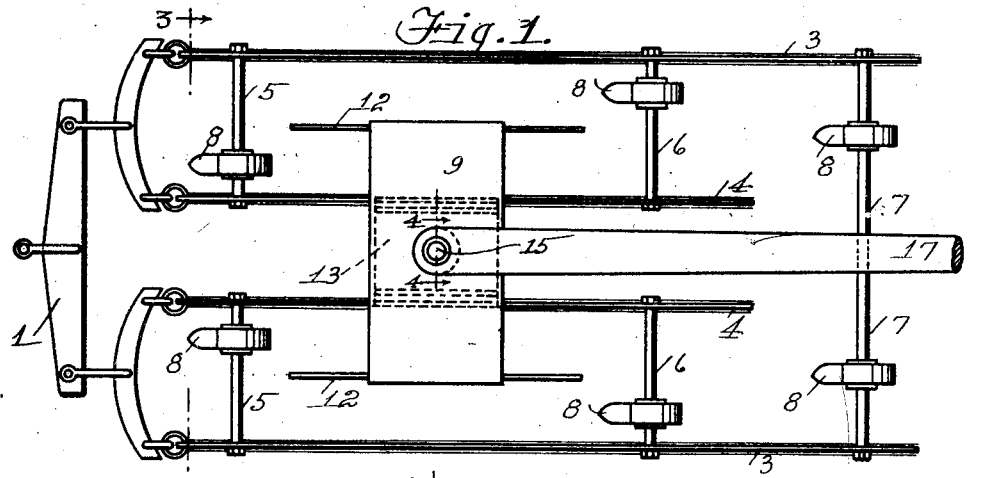
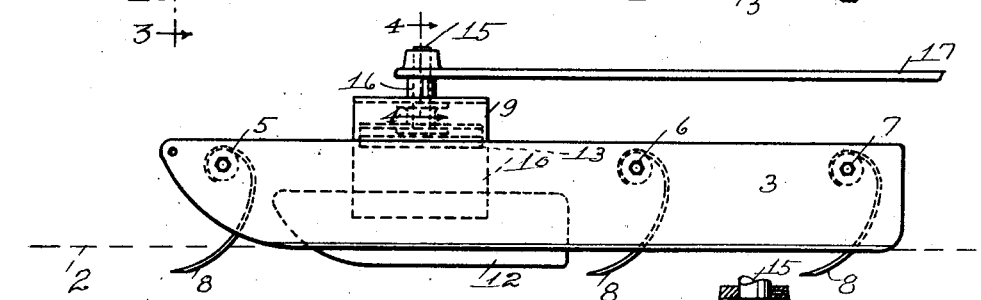
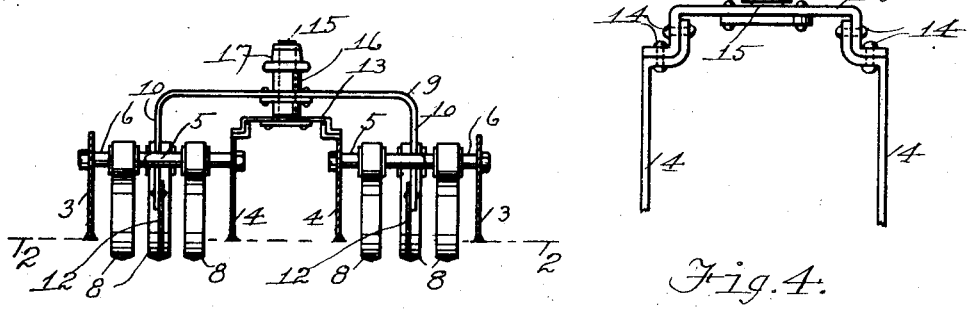
Witness
Geo L Chapel
INVENTOR:
Henry B. Thompson
BY
Cyrus W. Rice
ATTORNEYS.

Patented Aug. 7, 1928.

1,679,639

UNITED STATES PATENT OFFICE.

HENRY B. THOMPSON, OF BOWNE TOWNSHIP, KENT COUNTY, MICHIGAN.

HARROW.

Application filed August 30, 1926. Serial No. 132,446.

The present invention relates to harrows; and its object is to provide improved means for guiding a harrow in its drawn movement over the ground.

This object is attained by, and the invention finds preferable embodiment in, the structure hereinafter particularly described in the body of this specification and illustrated by the accompanying drawings, in which:—

Figure 1 is a top plan view of a harrow;

Figure 2 is a side view thereof;

Figure 3 is a transverse sectional view of the same taken on line 3—3 of Figure 1; and Figure 4 is a front view (enlarged) of certain parts of the structure, partly sectioned on line 4—4 of Figures 1 and 2.

In the accompanying drawings, a harrow for cultivating land is shown, adapted to be drawn longitudinally, as by the cross-bar or tree 1 secured to its forward end. This harrow has a body comprising, in the illustrated construction, two pairs of longitudinally extending runners or shoes supported on the ground (indicated at 2 in dotted lines), the outer and longer runners 3 of each pair being spaced from the inner and shorter runners 4 of said pairs, and the runners, 3, 4 of each pair being connected by cross-bars 5, 6, the outer runners 3 being connected by a cross-bar 7. These cross-bars carry harrow teeth of any suitable and well-known type, spring teeth 8 being illustrated by the drawings. A member or bridge 9 extends transversely and above the body of the harrow and has downwardly extending arms 10 to which are secured, as by rivets, the guiding runners 12 positioned between the runners 3, 4 respectively, and extending in the harrow's longitudinal direction and downwardly below their lower edges, in order to engage in, and cut a groove in, the ground in the harrow's drawn movement. The inner runners 4 are connected at their upper edges by a cross-bar 13, as by the rivets 14. The bridge member 9 and the guiding runners 12 are turnable on a vertical axis relatively to the cross-bar 13 and the runners 3, 4, by a suitable pivotal connection, such connection in the illustrated construction being a short spindle 15 carried by, and extending upwardly from, the cross-bar 13, and having a sleeve 16 turnable thereon and keyed to the bridge member 9. This sleeve has a handle arm 17 extending rearwardly to a position behind the harrow wherein it may be grasped to turn the guiding runners 12 to the right hand or to the left hand and thus guide the harrow in its drawn movement over the ground.

It may be sufficient, in some cases or for some uses, to dispense with the runners 3, 4, the body of the harrow being supported by the harrow teeth, and guided by the guiding runners 12.

The invention being intended to be pointed out in the claims, is not to be limited to or by details of construction of the particular embodiment thereof illustrated by the drawings or hereinbefore described.

I claim:

1. In a harrow: a body adapted to be drawn longitudinally, having harrow teeth, and comprising spaced runners supported on the ground and extending in the body's longitudinal direction; a guiding runner between the first-mentioned runners and extending in the body's longitudinal direction, and adapted to engage in the ground in the body's drawn movement, the guiding runner being turnable relatively to the body about a vertical axis.

2. In a harrow: a body adapted to be drawn longitudinally, having harrow teeth, and comprising spaced runners supported on the ground and extending in the body's longitudinal direction; a member extending transversely of the body; a guiding runner between the first-mentioned runners, carried by said member and extending in the body's longitudinal direction and adapted to engage in the ground in the body's drawn movement, said member being mounted on the body turnably about a vertical axis.

In testimony whereof I have hereunto set my hand at Grand Rapids, Michigan, this 26th day of August, 1926.

HENRY B. THOMPSON.